(12) United States Patent
Bottasso et al.

(10) Patent No.: US 10,384,770 B2
(45) Date of Patent: Aug. 20, 2019

(54) HELICOPTER WITH NOISE AND VIBRATION DAMPING TRANSMISSION MOUNTING

(71) Applicant: LEONARDO S.p.A., Rome (IT)

(72) Inventors: Luigi Maria Bottasso, Samarate (IT); Gian Luca Ghiringhelli, Samarate (IT); Alessandro Perazzolo, Samarate (IT); Fausto Cenedese, Samarate (IT)

(73) Assignee: LEONARDO S.P.A., Rome (IT)

( * ) Notice: Subject to any disclaimer, the term of this patent is extended or adjusted under 35 U.S.C. 154(b) by 402 days.

(21) Appl. No.: 15/323,653

(22) PCT Filed: Jul. 3, 2015

(86) PCT No.: PCT/IB2015/055045
§ 371 (c)(1),
(2) Date: Jan. 3, 2017

(87) PCT Pub. No.: WO2016/001901
PCT Pub. Date: Jan. 7, 2016

(65) Prior Publication Data
US 2017/0137120 A1    May 18, 2017

(30) Foreign Application Priority Data
Jul. 4, 2014 (EP) .................................... 14425091

(51) Int. Cl.
B64C 27/00 (2006.01)
B64C 27/12 (2006.01)
B64C 27/82 (2006.01)

(52) U.S. Cl.
CPC ............ *B64C 27/001* (2013.01); *B64C 27/12* (2013.01); *B64C 27/82* (2013.01); *B64C 2027/002* (2013.01)

(58) Field of Classification Search
CPC . B64C 27/001; B64C 2027/002; B64C 27/12; Y10S 416/50
See application file for complete search history.

(56) References Cited

U.S. PATENT DOCUMENTS

| | | | |
|---|---|---|---|
| 3,502,290 A * | 3/1970 | Legrand ................ | B64C 27/001 244/17.27 |
| 3,858,831 A * | 1/1975 | Halwes ................. | B64C 27/001 244/17.27 |
| 3,920,202 A * | 11/1975 | Mouille ................ | B64C 27/001 244/17.27 |

(Continued)

FOREIGN PATENT DOCUMENTS

| | | | |
|---|---|---|---|
| EP | 0063078 A1 * | 10/1982 | ........... B64C 27/001 |
| EP | 1 918 198 | 5/2008 | |

(Continued)

*Primary Examiner* — Benjamin P Lee
(74) *Attorney, Agent, or Firm* — Leason Ellis LLP

(57) ABSTRACT

A helicopter is described that comprises: a rotor; a fuselage; a drive transmission unit operatively connected to the rotor; a support body, which supports the transmission unit; and constraining means interposed between the support body and the fuselage; the constraining means in turn comprise a crosspiece connected in a fixed manner with respect to the support body and having a first lying plane; the crosspiece is formed in part by a metallic material and in part by a visco-elastic material.

10 Claims, 7 Drawing Sheets

(56) References Cited

U.S. PATENT DOCUMENTS

| | | | | |
|---|---|---|---|---|
| 4,014,484 A * | 3/1977 | Mouille | ............... | B64C 27/001 188/268 |
| 4,111,386 A * | 9/1978 | Kenigsberg | ........... | B64C 27/001 244/17.27 |
| 4,274,510 A * | 6/1981 | Mouille | ............... | B64C 27/001 244/17.27 |
| 5,782,430 A * | 7/1998 | Mouille | ............... | B64C 27/001 244/17.27 |
| 5,788,182 A * | 8/1998 | Guimbal | ............... | B64C 27/001 244/17.11 |
| 8,141,813 B2 * | 3/2012 | Pancotti | ............... | B64C 27/001 244/17.11 |

FOREIGN PATENT DOCUMENTS

| | | | | |
|---|---|---|---|---|
| EP | 2 179 922 | | 4/2010 | |
| FR | 2441902 A2 * | | 6/1980 | ........... B64C 27/001 |
| FR | 2728538 A1 * | | 6/1996 | ........... B64C 27/001 |
| WO | WO-9620107 A1 * | | 7/1996 | ........... B64C 27/001 |

* cited by examiner

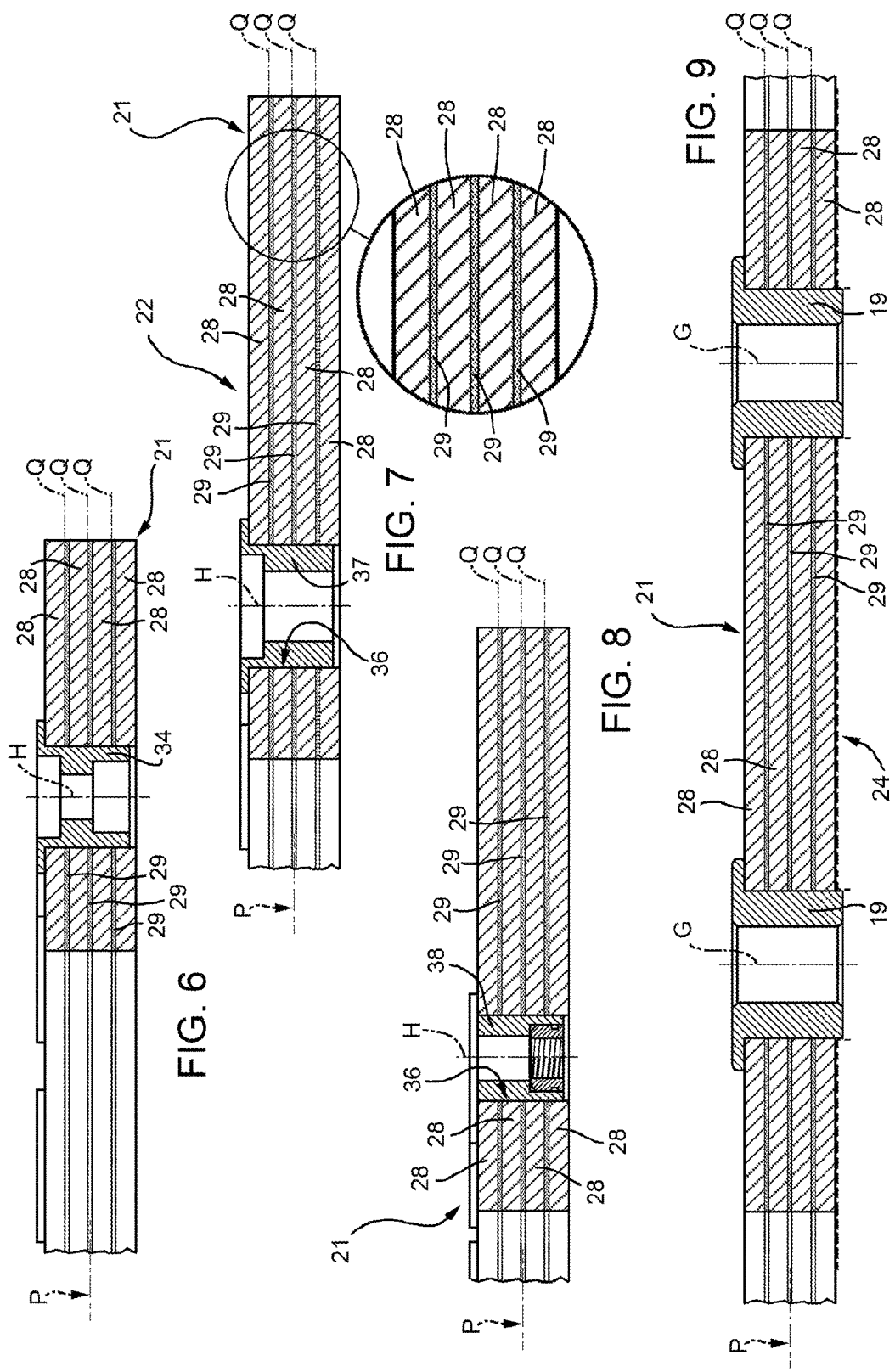

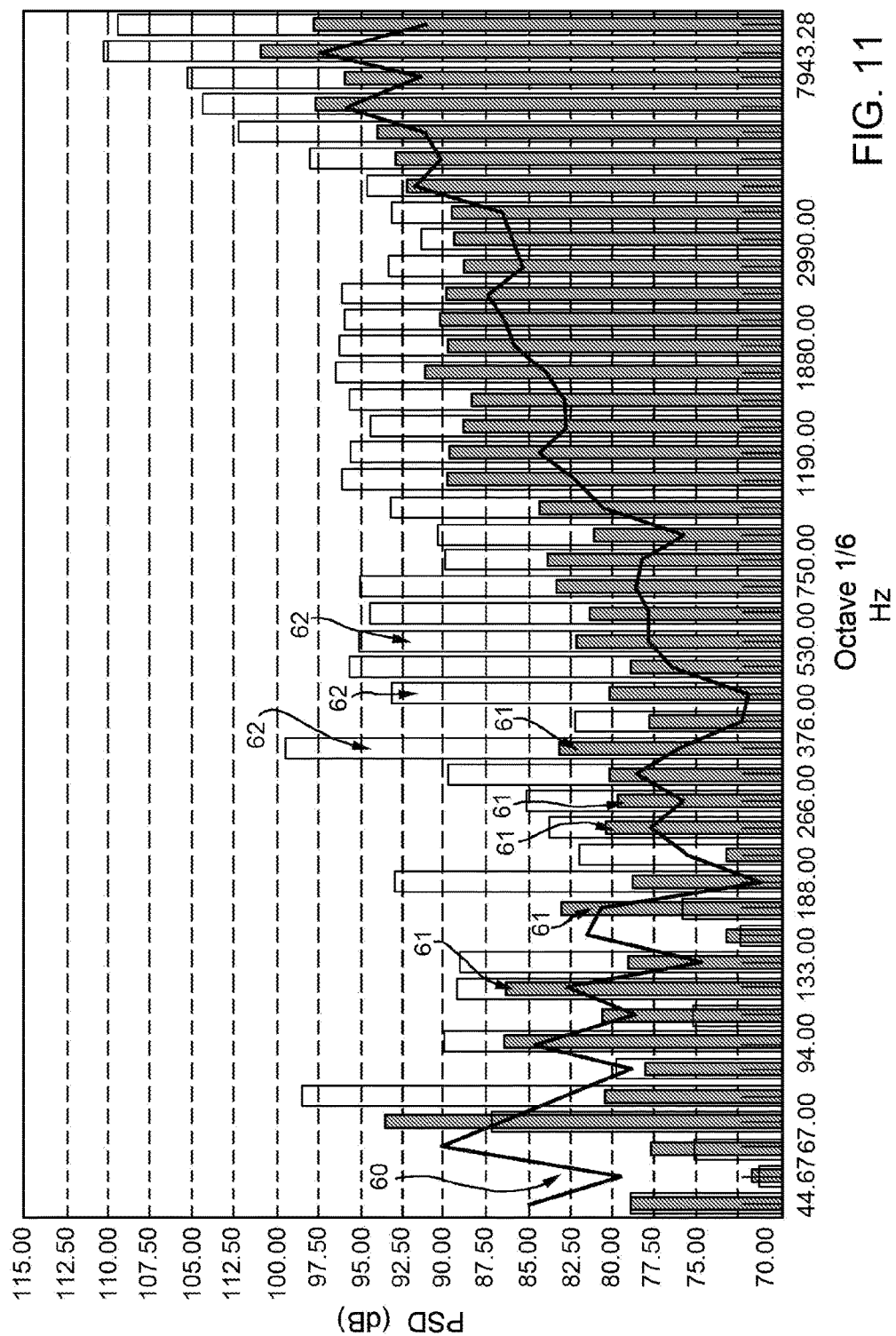

HELICOPTER WITH NOISE AND VIBRATION DAMPING TRANSMISSION MOUNTING

CROSS REFERENCE TO RELATED APPLICATIONS

The present application is a U.S. National Phase of International Patent Application PCT/IB2015/055045, filed on Jul. 3, 2015, which claims priority to European Application No. 14425091.7, filed on Jul. 4, 2014, each of which is incorporated by reference as if expressly set forth in their respective entireties herein.

TECHNICAL FIELD

The present invention relates to a helicopter.

BACKGROUND ART

Helicopters are known that essentially comprise a fuselage defining a cabin for the crew at the front, a main rotor mounted on the top of a central portion of the fuselage and able to generate the lift and thrust, respectively necessary for lift and directional flight of the helicopter, and an anti-torque rotor projecting sideways from a tail fin of the helicopter.

In greater detail, the main rotor comprises a drive shaft and a plurality of blades hinged on the drive shaft through the interposition of a hub.

The helicopter also comprises at least one engine, a transmission unit interposed between the engine and the drive shaft, and a constraint device securing the fuselage to a support body of the drive shaft and the transmission unit. In practice, the fuselage appears "suspended" from the above-mentioned support body by means of the constraint device.

During the helicopter's normal operation, the engine exerts drive torque on the transmission unit. According to the law of action-reaction, reaction torque is discharged onto the support body and from the latter it is discharged onto the fuselage through the constraint device. This reaction torque is balanced by the counter-torque exerted by the tail rotor on the fuselage.

The constraint device inevitably transmits vibration and noise to the fuselage, which reach the cabin and impair the comfort of the crew.

The constraint device is, in a known manner, formed by a crosspiece, which comprises:
- a flange bolted to a casing of the transmission unit and defining an opening; and
- a pair of appendages, projecting sideways from respective ends opposite to each other of the flange and connected to the fuselage.

In order to reduce the transmission of the aforementioned vibration and noise to the cabin, a European patent application published as EP-A-2179922 in the name of the applicant proposed:
- constraining each appendage to the fuselage by a pair of respective constraining elements; and
- interposing a damper assembly between each constraining element and the respective appendage.

More in particular, each damper assembly comprises an alternating plurality of layers made of an elastomeric material and layers made of a metallic material whereas the flange is made of metallic material.

Although curbing the transmission of noise and vibration to the fuselage, the solution described in the aforementioned patent application EP-A-2179922 has certain margins for improvement.

In particular, the layers of elastomeric material in the damper assemblies must be sufficiently rigid to be able to support the static load constituted by the reaction torque, which is transmitted from the support body of the transmission unit to the fuselage and the cabin.

The damper assemblies of constraint devices of known type can also contain a small amount of elastomeric material, substantially due to the fact that each damper assembly is interposed between a side of an associated appendage and the fuselage.

It follows that, due to the aforementioned design constraints, it is not possible to size the layers made of elastomeric material in an optimal manner to limit the transmission of noise and/or vibration to the cabin.

More specifically, the applicant has observed that, due to the aforementioned design constraints, the constraint device described in patent application EP-A-2179922 has margins for improvement with respect to the frequency bandwidth in which the transmission of vibration and/or noise is effectively contained.

In particular, the effectiveness of the constraint device described in patent application EP-A-2179922 is particularly susceptible to improvement for frequencies in the order of 1000 Hz, which correspond to the transmission of particularly irritating noise for the occupants of the cabin.

Thus, a need is felt within the industry to have constraint devices that are able to sustain the static load caused by the reaction torque and are optimally sizable for limiting the transmission of noise and/or vibration to the cabin and to the fuselage.

Furthermore, considerable surface areas of the layers of elastomeric material in the aforementioned damper assemblies are exposed to the outside environment, and are therefore subject to significant aging and attack by external agents.

Moreover, the layers of elastomeric material are subjected to static load generated by the reaction torque, which thus gives rise to significant fatigue.

It follows that it is necessary to periodically inspect the plates of elastomeric material or protect them with a protective material.

Thus, a need is felt within the industry to limit the requirement for periodically inspecting and/or protecting the layers of elastomeric material.

U.S. Pat. No. 3,920,202 describes a constraint device, which comprises a substantially circular flange connected to the fuselage via blocks formed by an alternating plurality of layers of a metallic material and layers of an elastomeric material.

U.S. Pat. No. 4,111,386 describes a vibration insulation system for vibrations transmitted to the fuselage by the rotor comprising a plurality of support elements, each of which in turn comprises an alternating plurality of layers of a metallic material and layers of an elastomeric material.

U.S. Pat. No. 4,014,484 discloses a crossbar comprising a central arm fitted to a shaft of the gearbox and a pair of appendages fitted to respective arms of the fuselage.

EP-1918198 discloses a bearing hanger assembly, which includes a planar damper element fitted to a mounting block and defining an opening engaged by a shaft, mainly with the purpose of achieving an easy alignment of the shaft relative to the mounting block.

In greater detail, the planar damper element is made from PTFE filled with a relative small percentage of graphite.

DISCLOSURE OF INVENTION

The object of the present invention is to provide a helicopter in which at least one of the above needs is satisfied in a simple and inexpensive manner.

The aforesaid object is achieved by the present invention, in so far as it relates to helicopter according to claim 1.

BRIEF DESCRIPTION OF THE DRAWINGS

For a better understanding of the present invention, a preferred embodiment will now be described, purely by way of non-limitative example and with reference to the accompanying drawings, in which:

FIG. 6 is a section along line VI-VI in FIG. 4;

FIG. 7 is a section along line VII-VII in FIG. 4;

FIG. 8 is a section along line VIII-VIII in FIG. 4;

FIG. 9 is a section along line IX-IX in FIG. 4;

FIG. 11 shows the experimental trend of the power spectral density for two embodiments of the constraint device in FIGS. 2 to 8 and for a constraint device made entirely of Aluminium 7075 T6, as the operating vibration frequency changes.

BEST MODE FOR CARRYING OUT THE INVENTION

Figure 1:
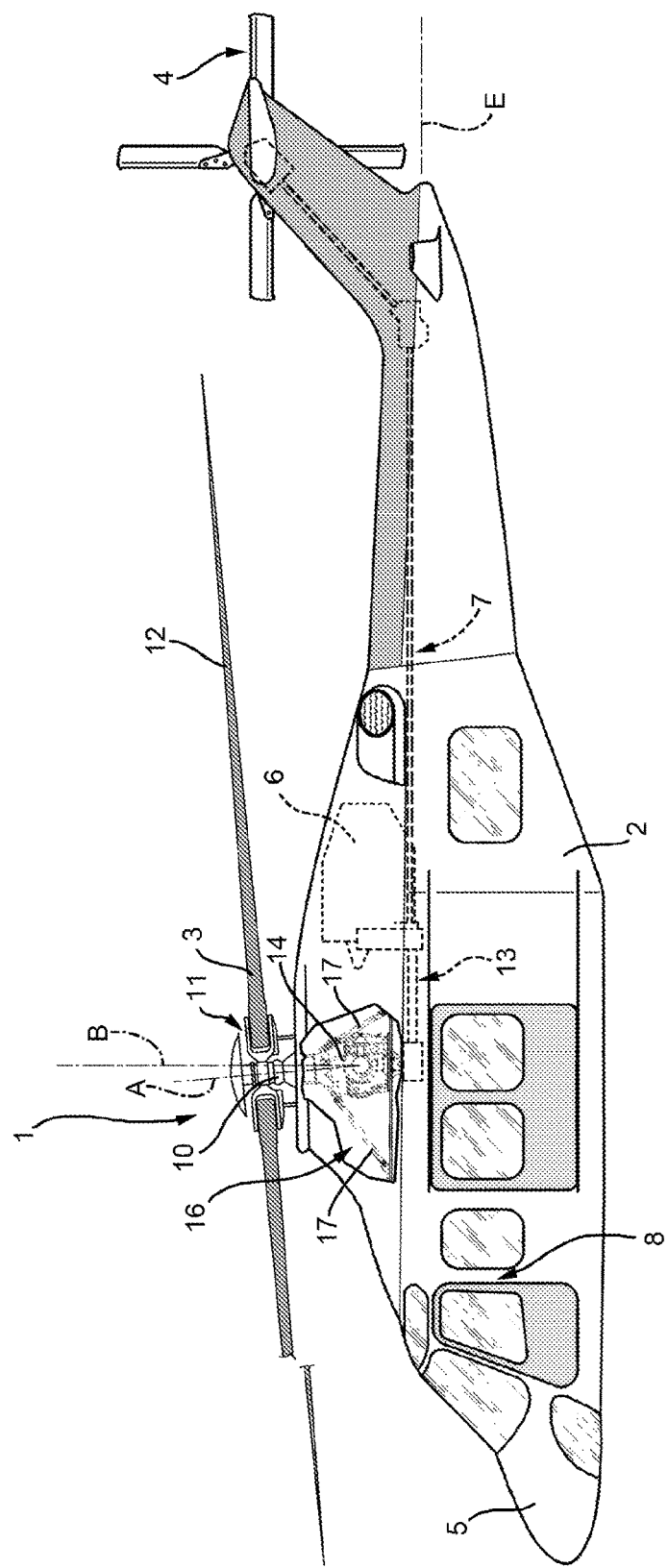
FIG. 1 is a side view of a helicopter designed according to the present invention.

With reference to FIG. 1, reference numeral 1 indicates a helicopter essentially comprising a fuselage 2 equipped with a nose 5, at least one engine 6 (only shown schematically in FIG. 1), and a main rotor 3 mounted on top of the fuselage 2 for generating the lift and thrust, respectively necessary for lift and directional flight of the helicopter 1.

The main rotor 3 essentially comprises a drive shaft 10, a hub 11 hinged on the shaft 10, and a plurality of blades 12 hinged on the hub 11 and extending in respective directions transversal to an axis A of the shaft 10.

Figure 3:
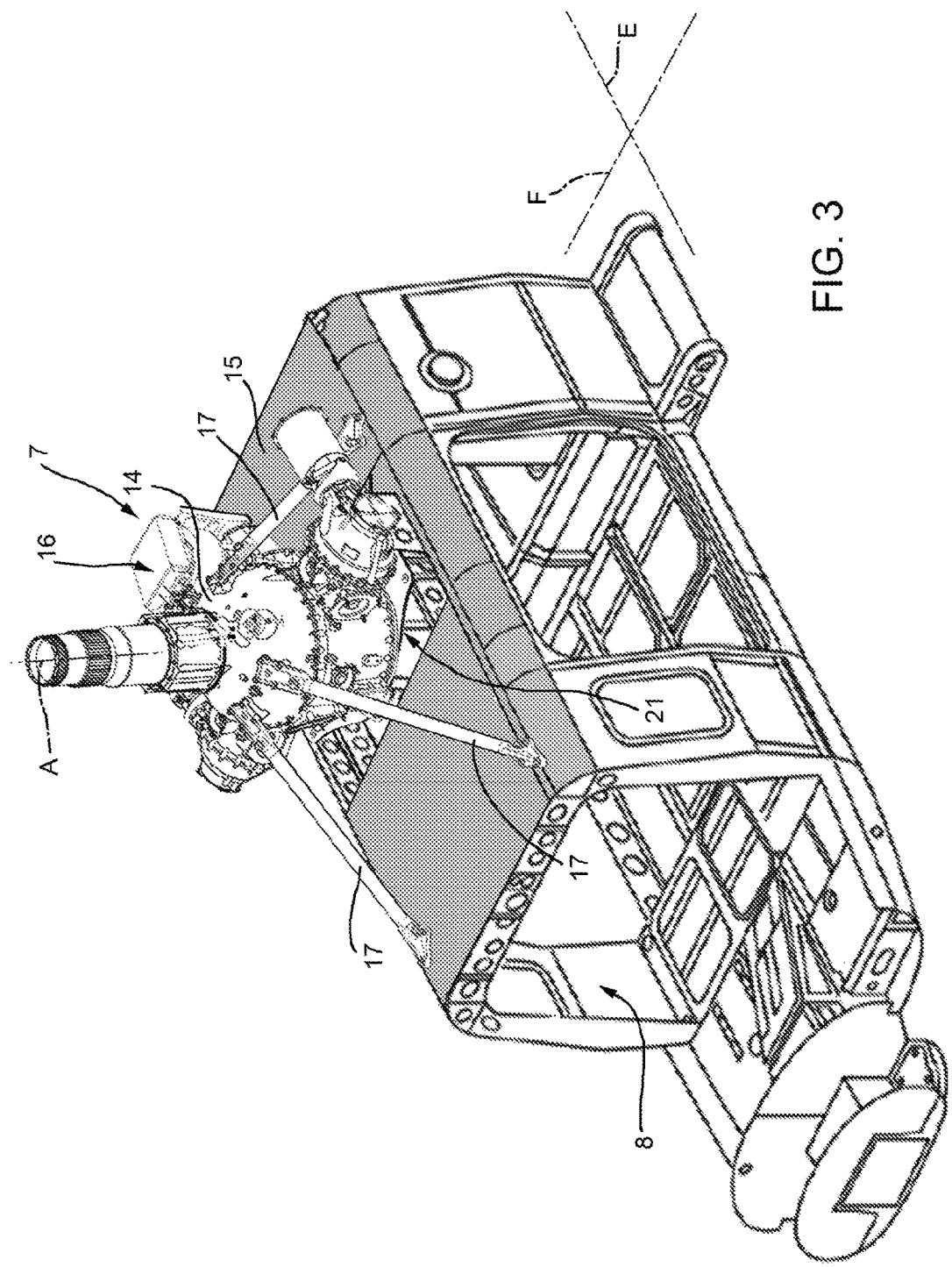
FIG. 3 shows a perspective view of the constraint assembly and additional components of the helicopter in FIG. 1.

The fuselage 2 defines a cabin 8 normally occupied by the crew and delimited above, on the side of the main rotor 3, by a wall 15 of the fuselage 2 (FIG. 3).

Figure 2:
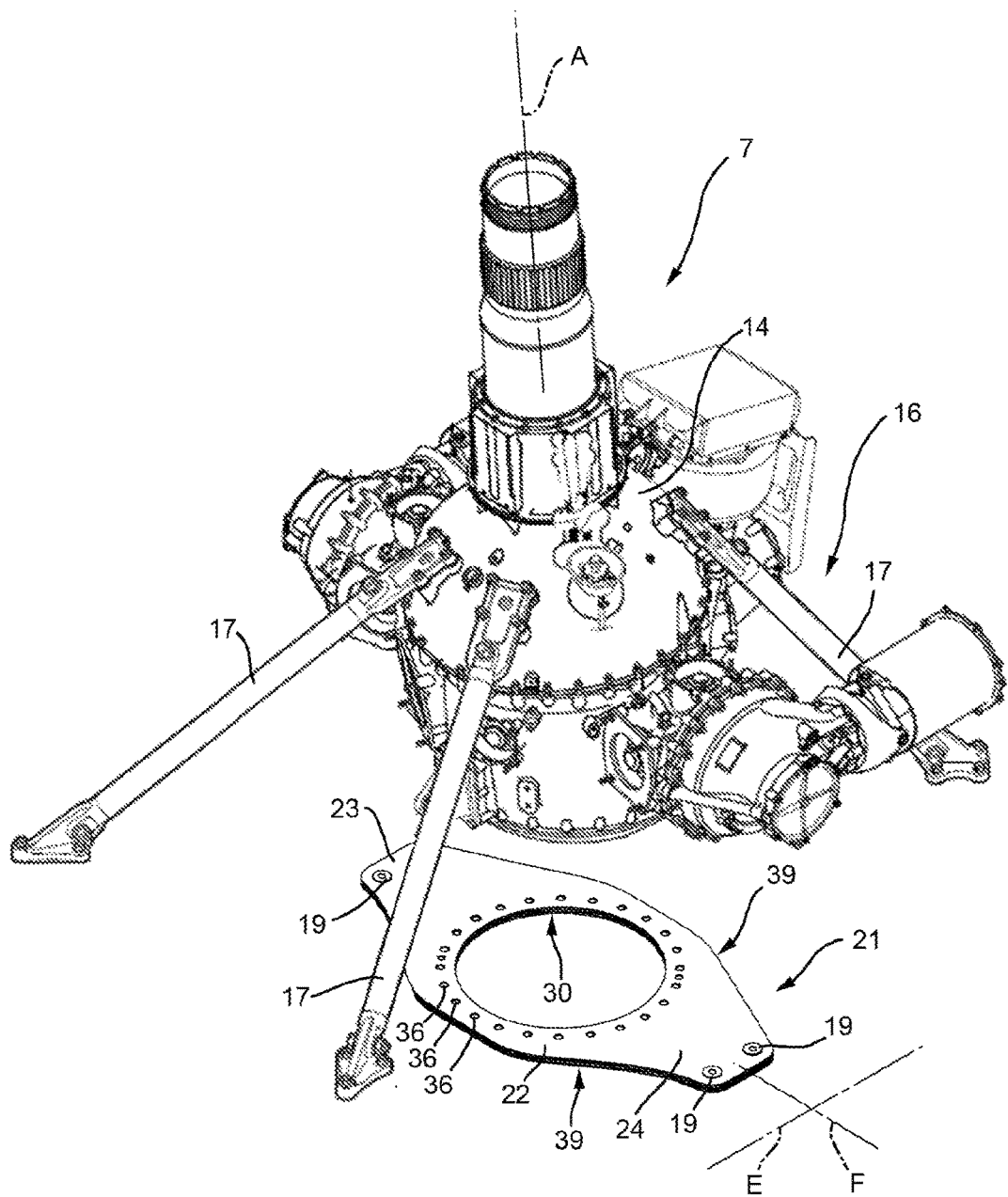
FIG. 2 shows a partially exploded perspective view, on an enlarged scale, of a constraint assembly of the helicopter in FIG. 1.

The helicopter 1 also comprises a transmission unit 7 (only shown schematically in FIGS. 1 to 3) operatively connecting an output member 13 of the engine 6 to the shaft 10, and a stator body supporting the member 13, the transmission unit 7 and the shaft 10 in a rotary manner.

The stator body is only shown as a casing 14 projecting from the wall 15 on the opposite side to the cabin 8 and supporting a final stage of the transmission unit 7 and the shaft 10 in a rotary manner around axis A.

The helicopter 1 also comprises an anti-torque tail rotor 4 projecting sideways from a fin of the fuselage 2 positioned at the opposite end from the nose 5, and constraining means 16 securing the casing 14 to the wall 15 of the fuselage 2.

The constraining means 16 essentially comprise:
- a plurality of rods 17, four in the case shown, extending along respective axes, oblique with respect to the wall 15 and axis A, between a lateral surface of the casing 14 and respective fastening points on the wall 15; and
- a constraint device connected to a bottom edge of the casing 14 and to the wall 15, and able to transmit reaction torque to the fuselage 2.

More specifically, this reaction torque is, according to the law of action-reaction, equal and opposite to the drive torque transmitted by the engine 6 to the shaft 10 via the transmission unit 7. This reaction torque is discharged onto the stator body and hence onto the casing 14 and is balanced by the counter torque generated by the tail rotor 4.

The constraint device essentially comprises (FIGS. 2 to 9) a crosspiece 21.

Figures 4, 5:
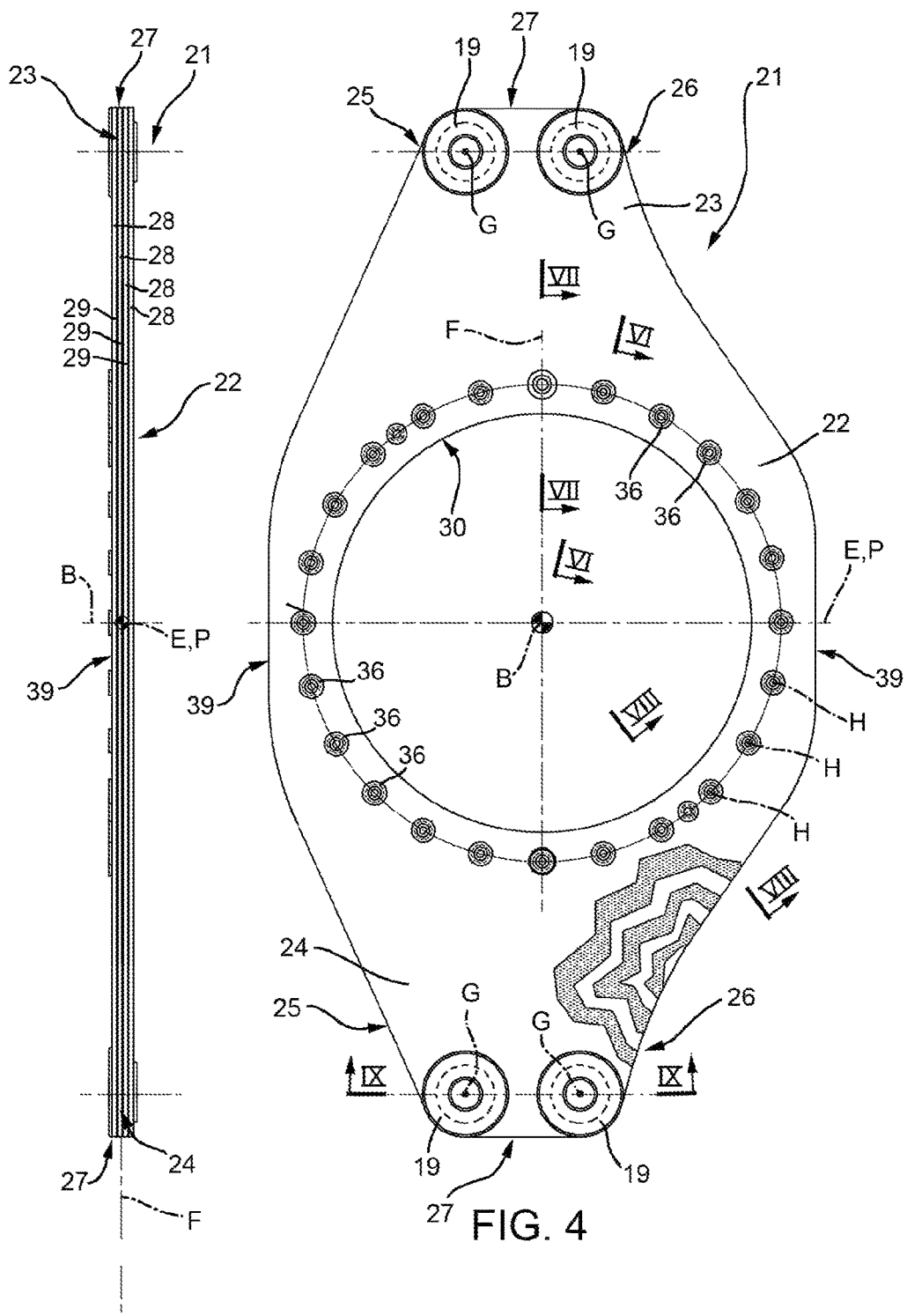
FIG. 4 is a top view of the constraint device in FIGS. 2 and 3.
FIG. 5 is a side view of the constraint device in FIGS. 2 to 4.

The crosspiece 21 has a lying plane P and is delimited by a plurality of sides 39 (FIG. 4).

The crosspiece 21 also extends along an axis F orthogonal to an axis E parallel to a longitudinal direction of the fuselage 2.

More in particular, the crosspiece 21 in turn comprises:
- a flange 22 bolted to the bottom edge of the casing 14 and defining a circular opening 30 with an axis B and through which axis A passes; and
- a pair of appendages 23 and 24 converging to respective sides opposite to each other with respect to axis B and projecting sideways from respective portions of the flange 22 located on opposite sides with respect to axis B.

More specifically, the flange 22 comprises a plurality of holes 36 equally spaced with respect to axis B and through which pass respective connecting elements 34, 37 and 38 (FIGS. 6 to 8) fastened to the bottom edge of the casing 14.

The appendages 23 and 24 are opposite to each other with respect to axis F.

In particular, axis B is inclined with respect to axis A.

The lying plane P of the crosspiece 21 is orthogonal to axis B and parallel to axes E and F.

Each appendage 23 and 24 is shaped like an isosceles trapezium.

in particular, each appendage 23 and 24 is also delimited by:
- a pair of edges 25 and 26 opposite to each other and contiguous with the flange 22; and
- an edge 27 interposed between edges 25 and 26.

In the case shown, edges 27 are parallel to axis E and edges 25 and 26 converge to axis F, going from axis B towards respective edges 27.

Axis E substantially coincides with a longitudinal direction of extension of the fuselage 2 and is orthogonal to an axis F visible in FIGS. 3, 4, 6, 7 and 8.

Each appendage 23 and 24 is fastened to the wall 15 of the fuselage by a pair of bolts 19 having respective axes G, which are parallel to axis B and aligned with each other parallel to axis E (FIGS. 4 and 9).

Advantageously, the crosspiece 21 is made partly of a metallic material and partly of a visco-elastic material.

In particular, the metallic material is aluminium.

The visco-elastic material is, in particular, an elastomeric material, preferably a rubber formed from butadiene and styrene, or formed from polychloroprene.

In greater detail, the whole crosspiece 21 is a multi-layer material, which is formed by (FIGS. 5 to 9):

a plurality of layers 28 of a metallic material; and
a plurality of layers 29 of a visco-elastic material.

Layers 28 and 29 alternate with each other and are superimposed on each other parallel to axis B.

Layers 28 and 29 lie on respective planes Q parallel to each other, parallel to plane P and orthogonal to axis B.

Advantageously, flange 22 and appendages are made of a multi-layer material formed by layers 28 and 29, and layers 28 and extend over the entire width of the crosspiece 21 on a plane parallel to plane P, so as to define sides 39 and be exposed to the environment outside the crosspiece 21.

The thickness measured parallel to axis B of layer 28 is preferably greater than the thickness of layer 29, also measured parallel to axis B.

The thickness of each layer 28 is between 1 mm and 10 mm.

The thickness of each layer 29 is between 0.1 mm and 1 mm.

In a preferred embodiment, the thickness of layer 28 is at least ten times the thickness of layer 29.

In a further preferred embodiment, the number of layers 29 is between two and four, and is preferably three.

In this further embodiment, the number of layers 28 is between three and five, and is preferably four.

Layers 28 and 29 are vulcanized.

In particular, layers 28 and 29 adjacent to and superimposed on each other are connected by:

gluing each layer 29 of visco-elastic material not yet vulcanized to the layers 28 adjacent to it; and
hot polymerization, for example in an oven, of layers 28 and 29 glued to each other so as to obtain vulcanization and the consequent adhesion of layers 28 and 29.

Figure 10:
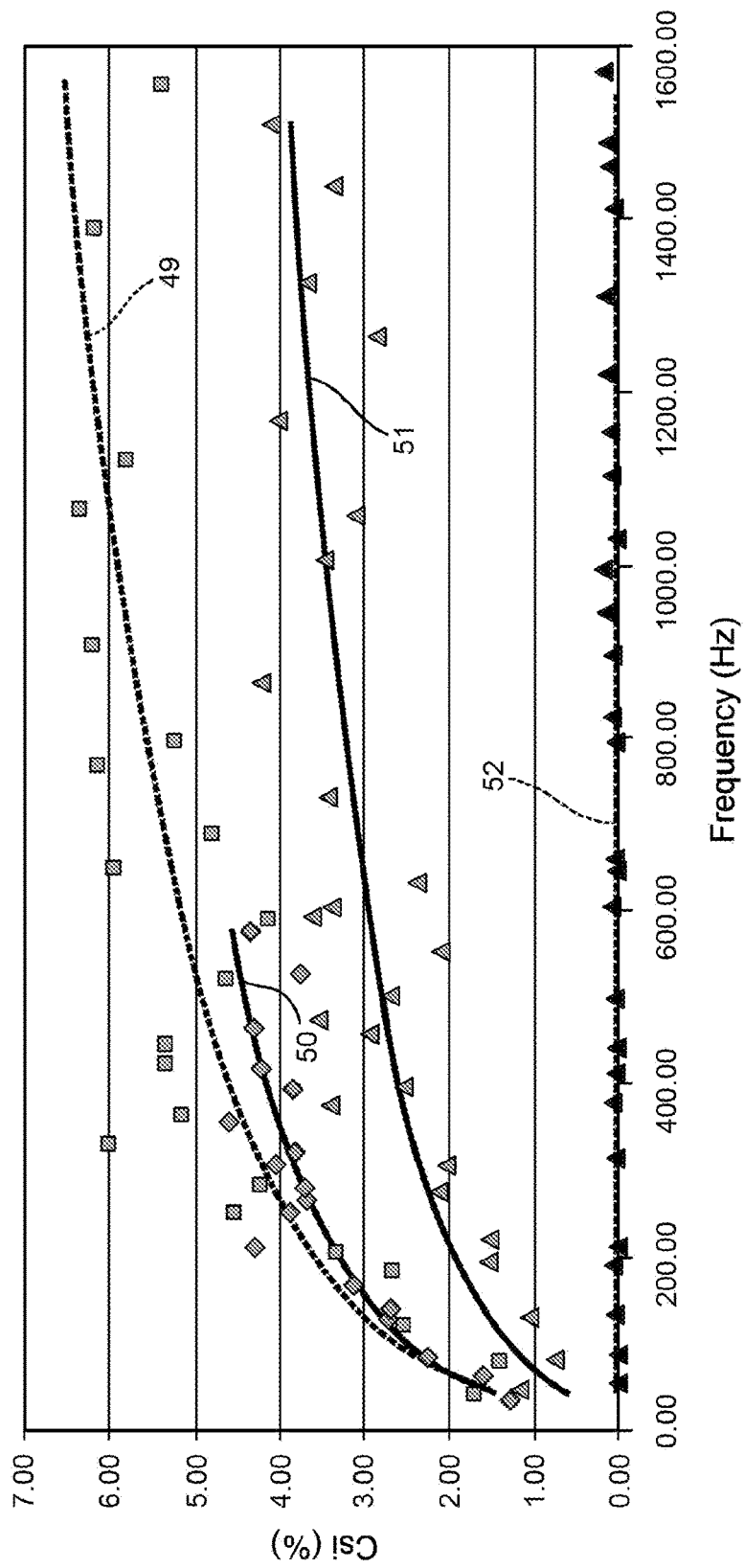
FIG. 10 shows the experimental trend of the damping coefficient for three embodiments of the constraint device in FIGS. 2 to 8 and of a constraint device made entirely of Aluminium 7075 T6, as the operating vibration frequency changes.

With reference to FIG. 10, the trend of the dimensionless damping coefficient Csi of the crosspiece 21 is shown with respect to the vibration frequency of the crosspiece 21.

More specifically, in FIG. 10:

line 49 indicates the interpolated trend of the coefficient Csi for a crosspiece 21 comprising four layers 28 and three layers 29 in polychloroprene;
line 50 indicates the interpolated trend of the coefficient Csi for a crosspiece 21 comprising four layers 28 and three layers 29 in styrene-butadiene;
line 51 indicates the interpolated trend of the coefficient Csi for a crosspiece 21 comprising sixteen layers 28 and fifteen layers 29; and
values 52 indicate the values of the coefficient Csi for a crosspiece made entirely of Aluminium 7075 T6.

As can be seen in FIG. 10, the coefficient Csi of crosspiece 21 comprising four layers 28 and three layers 29 in polychloroprene is greater than the coefficient Csi of the crosspiece 21 comprising four layers 28 and three layers 29 in styrene-butadiene, for all vibrational operating frequencies of the transmission unit 7.

The coefficient Csi of the crosspiece 21 comprising four layers 28 and three layers 29 in styrene-butadiene is greater than the coefficient Csi of the crosspiece 21 comprising sixteen layers 28 and fifteen layers 29, for all vibrational operating frequencies of the transmission unit 7.

The coefficient Csi of the crosspiece 21 comprising sixteen layers 28 and fifteen layers 29 is greater than the coefficient Csi of the crosspiece made entirely of Aluminium 7075 T6, for all vibrational operating frequencies of the transmission unit 7.

Furthermore, the crosspiece 21 is effective in containing transmission to the cabin 8 of vibrations at operating frequencies above 1000 Hz, which correspond to particularly irritating noises for the occupants in the cabin 8.

With reference to FIG. 11, as the work frequency changes:

reference 60 indicates the power spectral density of a crosspiece 21 having four layers 28 and three layers 29;
reference 61 indicates the power spectral density of a crosspiece 21 having two layers 28 and one layer 29; and
reference 62 indicates the power spectral density of a crosspiece made entirely of Aluminium 7075 T6.

In particular, the power spectral density 60, 61 and 62 is obtained through measuring the noise emission of the crosspiece 21 when the latter is subjected to vibration through external excitation.

As can be seen in FIG. 11, the power spectral density 62 of the crosspiece made entirely of aluminium is greater than the power spectral density 61 of the crosspiece 21 having two layers 28 and one layer 29, both for average value and at various vibration frequency values peculiar to the operation of the transmission unit 7.

Similarly, the spectral density 61 of the crosspiece 21 having two layers 28 and one layer 29 is greater than the power spectral density 60 of the crosspiece 21 having four layers 28 and three layers 29, for the average value and at various vibration frequency values peculiar to the operation of the transmission unit 7.

Since the spectral density 60, 61 and 62 is associated with the energy transmitted at the various frequencies, it follows that the crosspieces 21 reduce the transmission of vibration and/or noise to the fuselage 2 in a more effective manner than the crosspiece made entirely of Aluminium 7075 T6.

It is important to underline that the crosspieces 21 are effective in reducing the energy associated with vibrations at frequencies above 1000 Hz, which correspond to particularly irritating noise for the occupants in the cabin 8.

In use, the engine 6 drives the shaft 10 of the rotor 3 in rotation via the transmission unit 7.

The shaft 10 drives the blades 12 in rotation through the hub 11, thereby generating the thrust and lift, respectively necessary for directional flight and lift of the helicopter 1.

The thrust and lift are transmitted to the casing 14 and from the latter to the cabin 8, mainly through the rods 17.

According to the law of action-reaction, the torque transmitted by the shaft 10 generates a reaction torque on the casing 14 having a modulus equal to but of opposite direction to the torque acting on the shaft 10.

This reaction torque passes through the crosspiece 21, generating torsional torque on the crosspiece 21, and is transmitted to the cabin 8.

More specifically, the reaction torque is transmitted from the casing 14 to the flange 22 and to the appendages 23 and 24, and from the appendages 23 and 24 to the cabin 8 of the fuselage 2.

Operation of the rotor 3 induces vibrations on the casing 14.

These vibrations, together with the associated noise, are transmitted from the casing 14 to the flange 22 and to the appendages 23 and 24 of the flange 22.

In particular, for each vibration frequency of the crosspiece 21, it is possible to define:

a bending mode of vibration of the crosspiece 21, namely vibration in a plane orthogonal to plane P; and
a membrane mode of vibration of the crosspiece 21, namely vibration in plane P.

Bending modes allow activating the mechanism of interlaminar shear on layers 29, where the surfaces of layers 29 tend to slide one on top of the other whilst remaining parallel; this mechanism is particularly effective in energy damping through hysteresis of the visco-elastic material.

It follows that when the bending modes of the crosspiece 21 are activated, layers 29 are particularly effective in reducing the amplitude of vibrations and noise transmitted to the fuselage 2.

Otherwise, when the membrane modes are activated, the vibrations transmitted from the casing 14 cause the stretching and the shrinkage of layers 28 on plane P.

Due to the fact that they are connected to layers 28 adjacent to them, layers 29 also undergo stretching and the shrinkage on plane P. Since the stretching and the shrinkage of layers 29 substantially depends on the fact that layers 29 are connected to layers 28, energy dissipation is less effective in the case of membrane mode activation.

In this way, as can be seen in FIGS. 10 and 11, the crosspiece 21 curbs the transmission of vibration and/or noise to the cabin 8 and to the fuselage 2 in an effective manner for a wide range of frequencies and, in particular, those above 1000 Hz.

From examination of the characteristics of the helicopter 1 according to the present invention, the advantages it can provide are evident.

In particular, the whole crosspiece 21 (flange 22 and appendages 23, 24) is formed partly of layers 29 of a visco-elastic material and partly of layers 28 of a metallic material.

Due to this, the layers 28 of metallic material and the bolts 19 are effective in transmitting reaction torque from the casing 14 to the fuselage 2 while layers 29 are subjected to substantially negligible static load and are effective in damping the amplitude and energy of the vibrations and/or noise transmitted to the casing 14.

It follows that layers 29 are not subjected to design constraints for the purpose of guaranteeing a static load support capability, as was the case for the damper assemblies in the solution described in patent application EP-A-2179922.

With regard to this, the applicant has experimentally observed that, due to the crosspiece 21 being partly made of a visco-elastic material, the damping of the crosspiece 21 itself is much greater than in the solution described in patent application EP-A-2179922 (FIG. 10) for a wide range of vibration frequencies of the crosspiece 21.

The applicant has also noted that the energy associated with vibrations generated by the transmission unit 7 and transmitted from the crosspiece 21 to the fuselage 2 is much lower than the energy transmitted from crosspieces made entirely of Aluminium (FIG. 10) for a wide range of vibration frequencies of the crosspiece 21.

More specifically, the crosspiece 21 enables effectively damping vibrations transmitted to the fuselage 2, also in the acoustic domain (where the frequencies are of the order of a thousand hertz), where the dissipation efficiency of crosspieces made entirely of Aluminium is very limited.

In addition, the Applicant has found that crosspiece 21 makes use of the tangential elastic module of layers 29, thus achieving a more efficient damping mechanism than crosspiece shown in EP 2179922 and relying mainly on the longitudinal elastic module only of layers 29, i.e. on the compression of layers 29 orthogonally to plane P.

As a matter of fact, when crosspiece 21 is subjected to a high load due to torque exerted by rotor 3, layers 28 undergo substantially the whole high load whereas layers 29 only provides a distributed damping and undergoes very small load. As a result, the life-time of layers 29 is highly increased. On the contrary, in the crosspiece shown in EP 2179922, all the rubber layers of the appendages undergo the whole torque, thus having a reduce life-time.

Furthermore, since layers 29 are not stressed by very small static loads, they are subject to very limited wear and deterioration over time.

In addition, the crosspiece 21 according to the invention substantially does not set any limit regarding the amount of visco-elastic material that can be used, permitting the amount of energy dissipated by the crosspiece 21 to be raised with respect to known solutions illustrated in the introductory part of this description.

Since the crosspiece 21 is a multi-layer material formed by layers 28 and 29 parallel to plane P and orthogonal to axis B of the torsional torque, it is possible to exploit activation of the bending modes of vibration of the crosspiece 21 to effectively reduce the transmission of vibration and noise to the fuselage 2.

In fact, when the bending modes of vibration of the crosspiece 21 are activated, the layers 29 of visco-elastic material "shear" transfer the load between the respective layers 28 adjacent to them and dissipate the vibration amplitude and energy.

Due to the fact that the thickness of layers 29 is less than the thickness of layers 28, the ratio between the surfaces of the layers 29 facing the outside of the crosspiece 21—namely the surfaces of layers 29 defining sides 39—and the overall volume of the layers 29 is lower with respect to known solutions illustrated in the introductory part of this description.

In consequence, layers 29 are subject to aging and attack by external agents aging that are not negligible, but much less so with respect to the elastomeric plates of the damper assemblies described in patent application EP-A-2179922.

If follows that the crosspiece 21 needs a small number of periodic inspections or periodic protection treatments of sides 39 with a protective material.

As the thickness of layers 29 is between 0.1 mm and 1 mm, it is possible to obtain a compromise between the need to contain high deformation of layers 29—which would require thicknesses as small as possible—and the need to dampen vibrations through "shear" deformation of layers 29—which would require significant thicknesses for layers 29.

Since the number of layers 29 is between two and four, and is preferably three, it is possible, on the one hand, to have a sufficient number of layers 29 to obtain effective containment of the transmission of the transmission of noise and/or vibration without, at the same time, making the crosspiece 21 too complex and heavy or creating a risk of elastic instability in the crosspiece 21.

In particular, the applicant has observed that the median portion of the crosspiece 21 is the part most effective in reducing the transmission of noise and/or vibration to the fuselage 2, so as to render the use of particularly large number of layers 29 less convenient.

Finally, it is clear that modifications and variants can be made to the helicopter 1 described and illustrated herein without departing from the scope defined in the claims.

In particular, layers 28 and layers 29 could be connected to each other in a manner other than by vulcanization.

The invention claimed is:
1. A helicopter (1) comprising:
a rotor (3);
a fuselage (2);
a drive transmission unit (7) operatively connected to said rotor (3);

a support body (14), which supports said transmission unit (7); and constraining means (21) interposed between said support body (14) and said fuselage (2);

said constraining means (21) in turn comprising a crosspiece (21) connected in a fixed manner with respect to said support body (14) and having a first lying plane (P);

said crosspiece (21) being formed in part by a metallic material and in part by a visco-elastic material;

said crosspiece (21) comprising, in turn:

a flange (22) connected to said fuselage (2) and having an opening (30) having an axis (B) orthogonal to said plane (P); and a pair of end appendages (23, 24), which are arranged on respective opposite sides to each other of said axis (B) and are connected, in a fixed and rigid manner, to said fuselage (2); said appendages (23, 24) projecting sideways from respective portions of said flange (22) located on opposite sides with respect to said axis (B);

characterized in that said flange (22) and appendages (23, 24) are made of a multi-layer material, which comprises at least one first layer (28) of a metallic material and one second layer (29) of a visco-elastic material; said first layer (28) and second layer (29) being superimposed on each other;

said crosspiece (21) being delimited by lateral sides (39) extending transversely to said first plane (P);

said first layer (28) and second layer (29) extending over the entire width of said crosspiece (21) on a plane parallel to said first plane (P), so as to partly define said sides (39).

2. A helicopter according to claim 1, characterized in that said multi-layer material comprises an alternating plurality of said first layers (28) and said second layers (29).

3. A helicopter according to claim 1, characterized in that the thickness of said first layer (28) is at least ten times greater than the thickness of said second layer (29).

4. A helicopter according to claim 2, characterized in that said multilayer material comprises a number of said second layers (29) of between two and four.

5. A helicopter according to claim 1, characterized in that said visco-elastic material of said second layer (29) is an elastomeric material, which comprises a rubber formed from butadiene and styrene, or formed from polychloroprene.

6. A helicopter according to claim 1, characterized in that said first layer and second layer (28 and 29) are vulcanized together.

7. A helicopter according to claim 1, characterized in that said first layer (28) and second layer (29) are connected to each other.

8. A helicopter according to claim 1, characterized in that said first layer (28) and second layer (29) are hot polymerized.

9. A helicopter according to claim 1, characterized in that said first layer and second layer (28 and 29) extend on respective second planes (Q), which are parallel to each other and parallel to said first plane (P).

10. A helicopter according to claim 1, characterized in that said appendages (23 and 24) are bolted onto said fuselage (2).

* * * * *